United States Patent [19]
Morgan

[11] Patent Number: 5,372,339
[45] Date of Patent: Dec. 13, 1994

[54] MULTI-TIERED LITTER RACK SYSTEM

[75] Inventor: Roy L. Morgan, Franktown, Colo.

[73] Assignee: Air Methods Corporation International, Englewood, Colo.

[21] Appl. No.: 958,024

[22] Filed: Oct. 7, 1992

[51] Int. Cl.$^5$ .............................................. B64D 11/00
[52] U.S. Cl. .................................. 244/118.5; 296/19; 5/610
[58] Field of Search ............... 244/118.1, 118.5; 296/19; 5/8, 9.1, 602, 610, 611

[56] References Cited

U.S. PATENT DOCUMENTS

| | | | |
|---|---|---|---|
| 771,039 | 9/1904 | Boecker | 5/610 |
| 943,827 | 12/1909 | Hennessy | 5/610 |
| 3,605,136 | 9/1971 | Vichness et al. | 5/8 |
| 3,840,265 | 10/1974 | Stirling et al. | 296/19 |
| 4,178,032 | 12/1979 | Hone | 244/118.1 |
| 4,378,128 | 3/1983 | Holling et al. | 296/19 |
| 4,783,025 | 11/1988 | Moffett | 244/118.5 |

FOREIGN PATENT DOCUMENTS

| | | | |
|---|---|---|---|
| 1491267 | 10/1969 | Germany | 296/19 |
| 1715 | 1/1900 | United Kingdom | 296/19 |

Primary Examiner—Galen L. Barefoot
Attorney, Agent, or Firm—McCubbrey, Bartels & Ward

[57] ABSTRACT

A multi-tiered litter rack system is described generally comprising a plurality of support masts arranged on one wall of an emergency vehicle. The masts support a plurality of vertically spaced litters in at least two horizontally spaced positions. The masts enclose vertical adjustment screws which are adapted to independently adjust the vertical position of each end of the litters for controlling the tilt of and vertical spacing between the litters. The multi-tiered liter rack system further includes individual motors associated with each of the respective masts which are operatively connected to the vertical adjustment screws for controlling the vertical position and tilt of each of the litters.

6 Claims, 10 Drawing Sheets

MULTI-TIERED LITTER RACK SYSTEM

FIELD OF THE INVENTION

This invention relates generally to litter rack systems for use in emergency medical vehicles. More particularly, the invention relates to a multi-tiered litter rack system for use in the interior of an air-ambulance.

BACKGROUND OF THE INVENTION

In emergency medical service applications, air-ambulances, such as helicopters, have been used for emergency transfer and treatment of patients. Often such service involves transporting multiple patients and patients requiring immediate attention and treatment.

Various methods have been employed to transport patients in a helicopter. For example, in various medical systems, the patient is placed on a stretcher or litter which is attached to the floor or a fixed bench within the helicopter. These systems have proved unsatisfactory in several respects. First, in order for the EMS attendants or paramedics to work on the patient, they must get down on the floor, creating an awkward working posture. Second, the interior space is generally cramped and the attendants or paramedics in their crouched position generally take up more space than they would while sitting upright.

In order to alleviate the problems associated with the above referenced systems, several medical systems have been employed in helicopter interiors which place the patient(s) at a more comfortable level for the attendants or paramedics to work, as well as freeing up floor space within the emergency vehicle interior. These systems are, however, quite limited in usefulness and suffer from other considerable drawbacks. For example, numerous helicopters and/or fixed wing aircraft merely employ tiers of stationery litter racks. There is generally no mechanism to assist in the loading of the upper racks, nor any means for tilting the rack or racks in various orientations. Many of these systems also require an unacceptable level of manpower, physical effort and loading time which may be crucial. Illustrative are the litter rack systems disclosed in U.S. Pat. Nos. 2,370,402, 2,473,364, 2,480,322 and 3,358,300.

In U.S. Pat. No. 3,605,136, a powered litter rack is disclosed which could also be mounted in an air-ambulance. In the noted system, a pair of vertical frames are mounted within the vehicle, with endless chains provided along each side of the frames. The frames are provided with space brackets for supporting the handles of emergency litters. One or more litters can be positioned within the frames, and the endless chains are used to elevate the litter(s) in a vertical direction. The frames can also be operated independently to raise or lower either end of the litter(s) for medical treatment. A major drawback of the noted system is the use of a complex system of chains, gears and worms. This system also requires considerable space for operation and is, in general, unacceptably heavy for aircraft use.

In U.S. Pat. No. 4,378,128, another litter rack system is disclosed for elevating and supporting a pair of litters. In the noted system, a pair of actuators are provided on each end of the mechanism for raising and positioning the litter. The system is, however, manually operated, limited to two litters and also requires considerable space in the aircraft interior.

In U.S. Pat. No. 4,783,025, a powered litter rack system is disclosed for elevating and supporting a single litter. In general, the system employs a pair of vertical mounts positioned along one side of a litter pallet or platform. The mounts include a linear actuator and bearing blocks. Each bearing block has an outwardly extending arm, which is attached to the underside of the platform. The linear actuators are arranged to raise or lower the bearing blocks so as to vertically move the platform. Individual controls are also provided for independently operating each of the mounts, so that the platform can be raised horizontally with the head or foot section lowered or raised as desired. This system also suffers from various drawbacks.

First, the system is not multi-tiered and, hence, can only support one patient. Second, the linear actuator and all pertinent related components are designed external, with bearing rings sliding on vertical rods which provide vertical movement. The bearing ring/rod combination could therefore be subjected to sudden stoppage by foreign objects. Third, the bearing ring and rod assembly could also produce contamination and result in a less sterile environment due to lubrication requirements.

It is therefore an object of the present invention to provide a powered multi-tiered litter rack system for use in an emergency medical vehicle, such as a helicopter, which is self-contained, space efficient, requires less moving parts, is more resilient during operation and emergency load conditions, and permits free movement without fear of loose clothing or foreign objects binding or stopping the lift motion.

BRIEF DESCRIPTION OF THE DRAWINGS

Further features and advantages of the litter rack system disclosed herein will become apparent from the following and more particular description of the preferred embodiment of the invention as illustrated in the accompanying drawings, in which.

SUMMARY OF THE INVENTION

The litter rack system of the present invention substantially reduces or eliminates the disadvantages and shortcomings associated with the prior art. The litter rack system is multi-tiered and generally comprises a plurality of support means arranged to support a plurality of vertically spaced litters in at least two horizontally spaced positions. The multi-tiered litter rack system also includes vertical adjustment means which are adapted to independently adjust the vertical position of each of the support means for controlling the tilt of and vertical spacing between the litters. The vertical adjustment means include means for operatively mounting the vertical adjustment means to an interior wall of the vehicle. The multi-tiered litter rack system further includes control means which are operatively connected to the vertical adjustment means for controlling the vertical position and tilt of each of the litters.

DESCRIPTION OF THE PREFERRED EMBODIMENT

Figure 1:
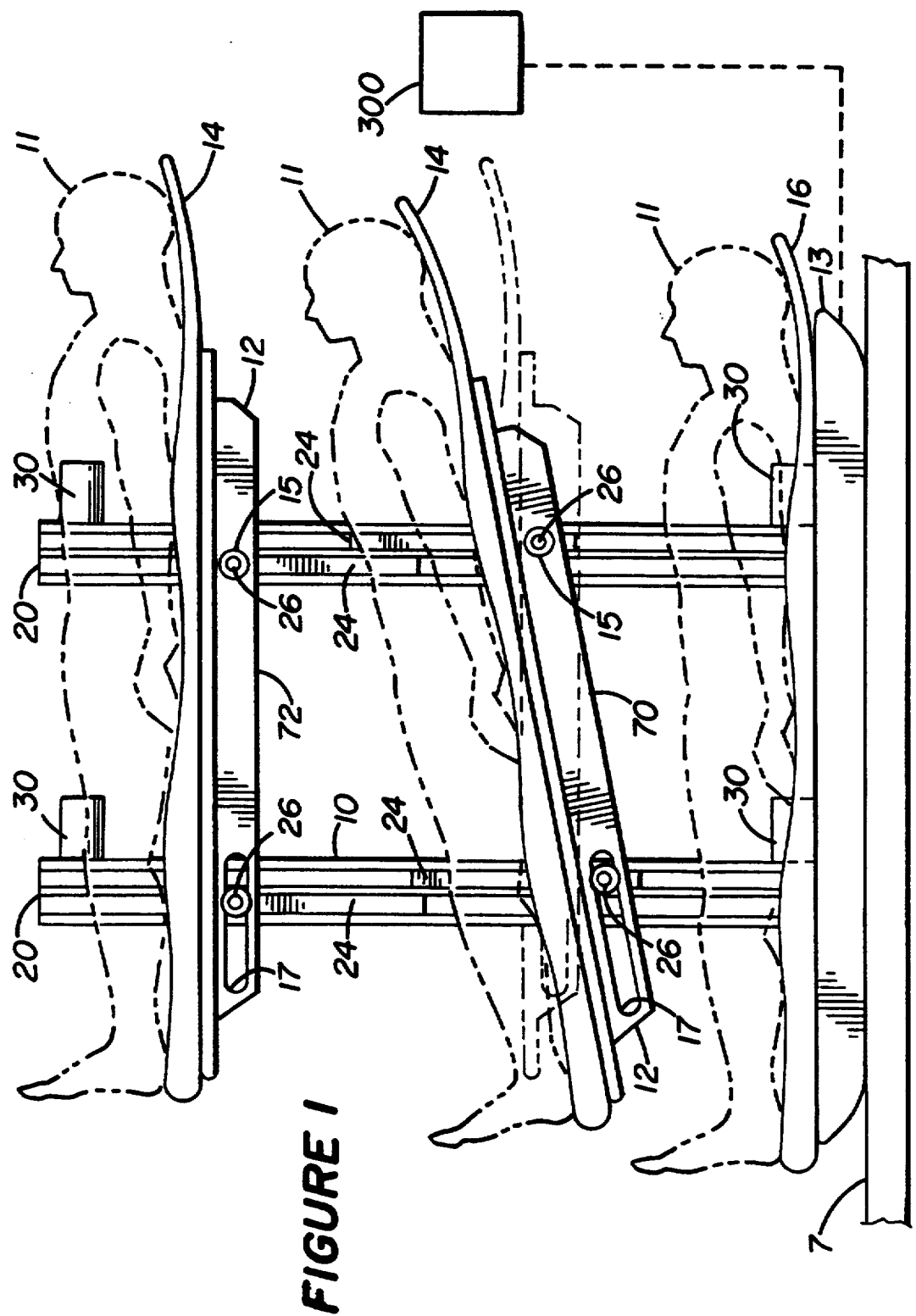
FIG. 1 is a front view of the litter platform support and positioning system of the present invention.
Figure 2:
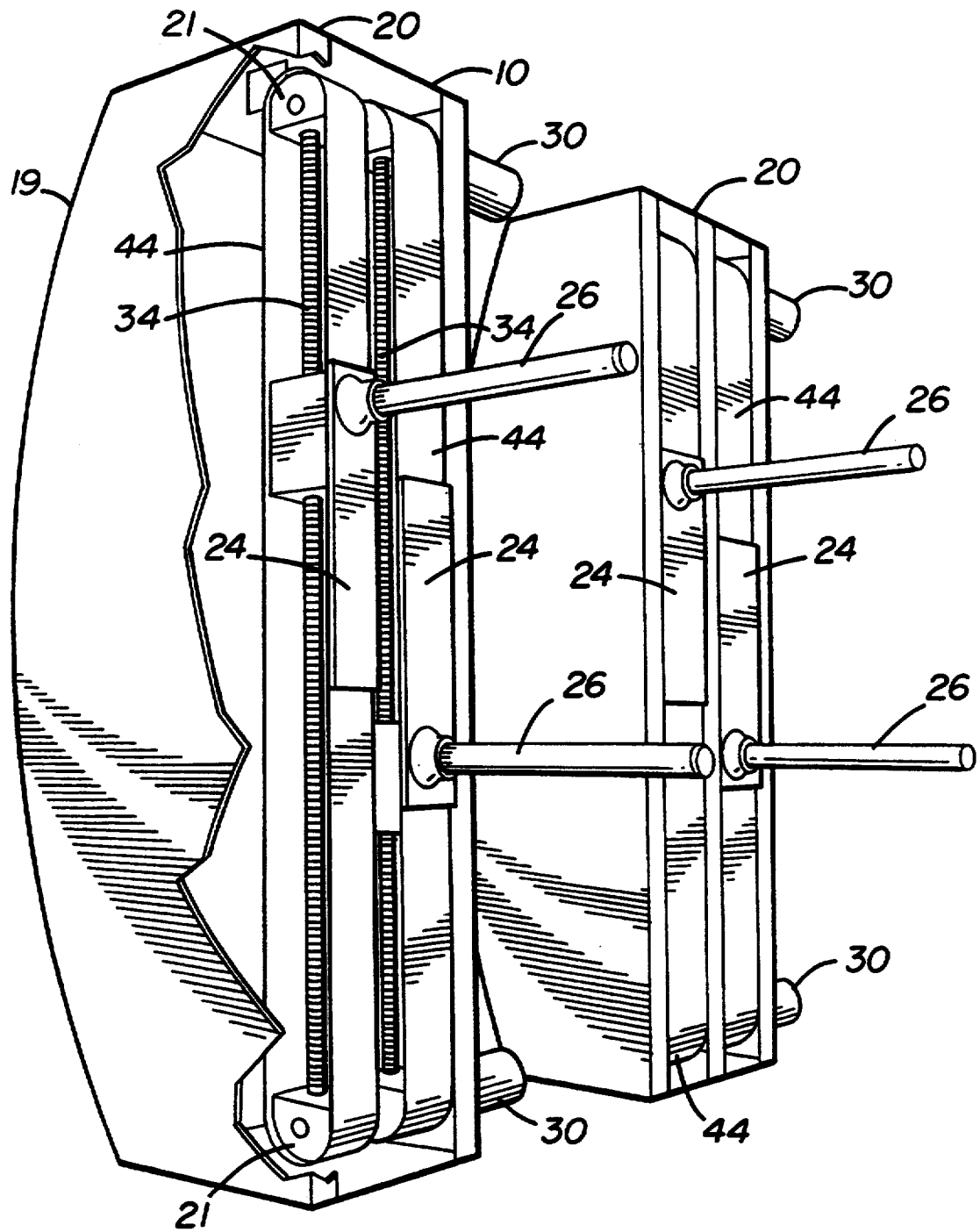
FIG. 2 is a perspective view of the litter platform support and positioning system of the present invention.

As illustrated in FIGS. 1 and 2, the litter rack system 10 of the present invention is multi-tiered and generally comprises a plurality of support means arranged to support a plurality of vertically spaced litters 14 in at least two horizontally spaced positions. The multi-tiered litter rack system also includes vertical adjustment means which are adapted to independently adjust the vertical position of each of the support means for controlling the tilt of and vertical spacing between the litters 14. The vertical adjustment means include means for operatively mounting the vertical adjustment means to an interior wall of the vehicle. The multi-tiered litter rack system further includes control means which are operatively connected to the vertical adjustment means for controlling the vertical position and tilt of each of the litters 14.

According to the invention, the multi-tiered litter rack system 10 includes at least two litter platforms 12 (see FIG. 1). Each of the litter platforms 12 are provided with a conventional litter latch (not shown) for engaging and securing a litter 14 with or without a patient 11 thereon. The litter platforms 12 are also provided with a conventional patient harness or restraint system (not shown) to secure a patient in a supine position thereon.

A key feature of the multi-tiered litter rack system 10 is the highly resilient vertical adjustment means. As illustrated in FIG. 2, the vertical adjustment means comprises a pair of substantially parallel horizontally spaced vertically elevating control masts 20. Each control mast 20 includes a pair of substantially parallel tracks 22 which are disposed within and in parallel relation with each of the control masts 20 (see FIG. 4). The control masts 20 are also adapted to be operatively mounted to an interior wall of an emergency vehicle by conventional means. By the term "vehicle", it is meant to mean an air-ambulance, which may be either a helicopter or fixed wing aircraft, or mechanized ground transport equipment.

The support means of the multi-tiered litter rack system 10 comprises a plurality of lift plates 24 which are adapted to slidably engage the control mast tracks 22. Each lift plate 24 is also provided with a horizontal support member 26 which is operatively connected to the lift plate 24 and adapted to rotatably engage one of the litter platforms 12 proximate each end thereof (see FIG. 1). The horizontal support members 26 are further adapted to pivotally engage the litter platforms 12 proximate one end and slidably engage the platforms 12 on the opposite end thereof whereby the platforms 12 are permitted to tilt on either end.

Figure 3:
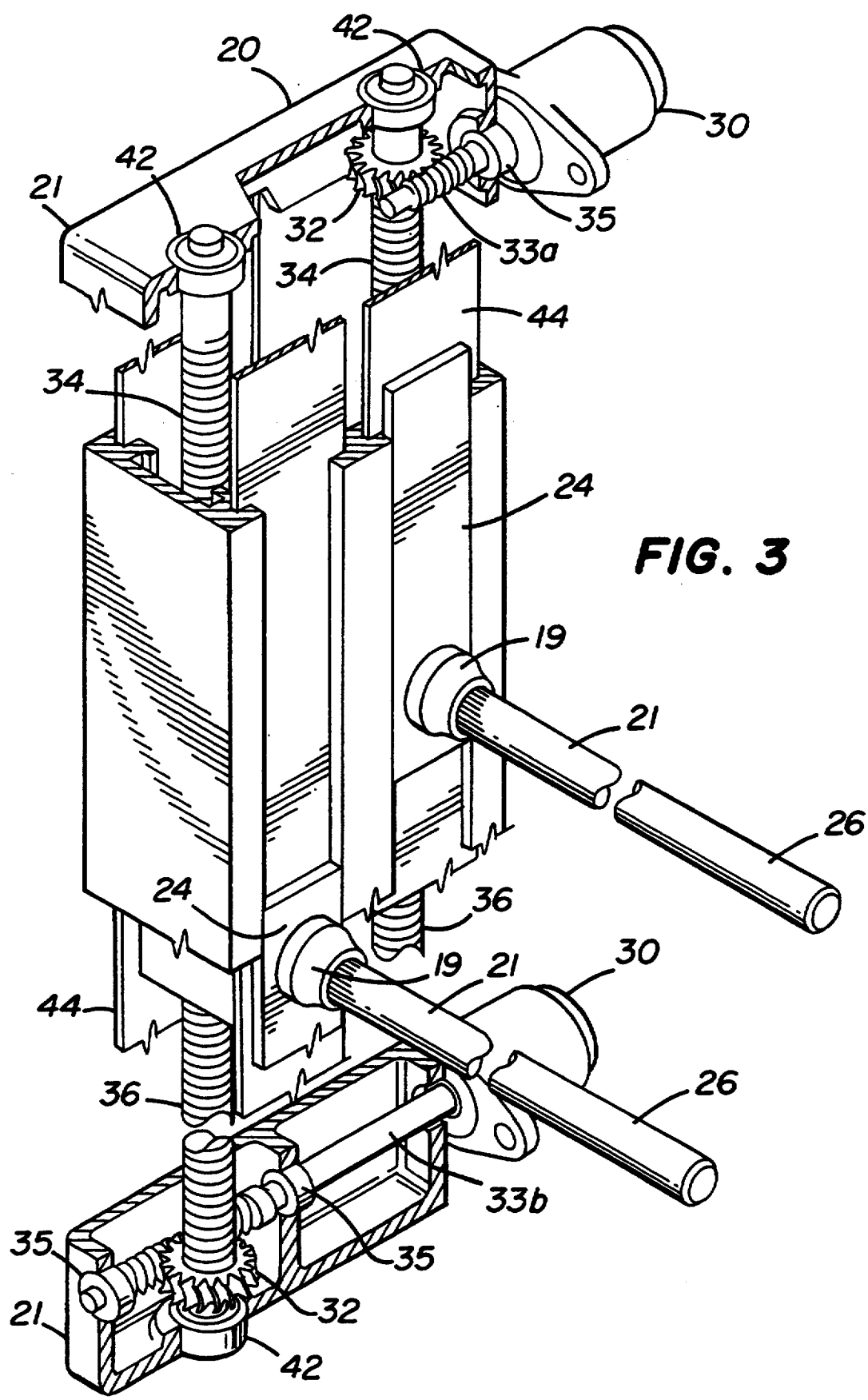
FIG. 3 is a perspective sectional view of a control mast illustrating the vertical adjustment, support and drive means according to the invention.

In the preferred embodiment, the horizontal support members 26 comprise a frustrum shaped circular base 19 and an elongated circular rod 21. As illustrated in FIG. 3, the base 19 is operatively attached to lift plate 24 on the large diameter end and designed and configured to engage the circular rod 21 on the small diameter end thereof such that the axes of the base 19 and rod 21 are substantially coincident. As will be recognized by one skilled in the art, the base 19 and rod 21 may be of integral construction and other support member 26 configurations may be employed within the slope of the invention.

To receivably engage the horizontal support members 26, the litter platforms 12 include fore and aft support holes 15, 17 which are designed and configured to rotatably receive the horizontal support members 26 (see FIG. 1). To facilitate the tilting of the litter platforms 12 and, thereby, the litters 14, the aft hole 17 of the litter platform 12 comprises an elongated hole. The horizontal support members 26 will thus pivotally engage the fore support hole 15 and slidably engage the aft elongated support hole 17. As will be recognized by one skilled in the art, the location of the elongated hole may be reversed (i.e., fore) to facilitate the supporting and tilting of the litter platforms 12.

To adjust the vertical spacing between and tilting of the litter platforms 12, the vertical adjustment means is further provided with drive means for vertical raising and lowering the lift plates 24 in each of the control mast tracks 22. The drive means may comprise various power options including electrically operated means, pneumatically operated means or even manually operated means, preferably electrically operated means. According to the invention, the electrically operated means comprises a plurality of electric motors 30 for synchronously driving the lift plates 24 and thereby lifting and positioning the litter platforms 12. In the preferred embodiment, as illustrated in FIG. 1, at least two motors 40 are operatively mounted to each control mast 20.

To transfer power from the drive means or electric motors 30 to the power transmission means of the invention and, ultimately, to the lift plates 24, each control mast 20 is provided with a pair of conventional worm-/gear assemblies 32 operatively mounted to each control mast 20 proximate each motor 30 (see FIG. 3). The worm gear shafts 33 are designed and configured to operatively engage the motors 30 and are provided with conventional bearing assemblies 35 operatively mounted in each control mast 20 to position and support each worm gear shaft 33 therein. In the preferred embodiment, as illustrated in FIG. 3, the worm gear shafts 33 are disposed within each control mast 20 on a substantially horizontal plane. As will be recognized by one skilled in the art, various gear shaft 33 orientations and-/or gear assemblies may be employed within the scope of this invention to facilitate the various power options.

In the preferred embodiment, as illustrated in FIG. 3, one worm/gear assembly 32 and motor 30 is disposed at the top of each control mast 20 and one worm/gear assembly 32 and motor 30 is disposed at the bottom. However, the control masts 20 are designed and configured for placement of both gear assemblies 32 at the top or bottom of the control masts 20 and the placement of both motors 30 on either side of the control masts 20 or at the top or bottom thereof, to suit the particular application.

According to the invention, each control mast 20 is also provided with power transmission means to transfer power from the drive means to the support means. In the preferred embodiment, the power transmission means comprises a plurality of ball nut and screw assemblies 34. As illustrated in FIG. 3, a pair of ball nut/screw assemblies 34 are disposed in each control mast 20 such that each of the screws 36 of the assemblies 34 are in substantially parallel relation with each control mast track 22.

Figure 4:
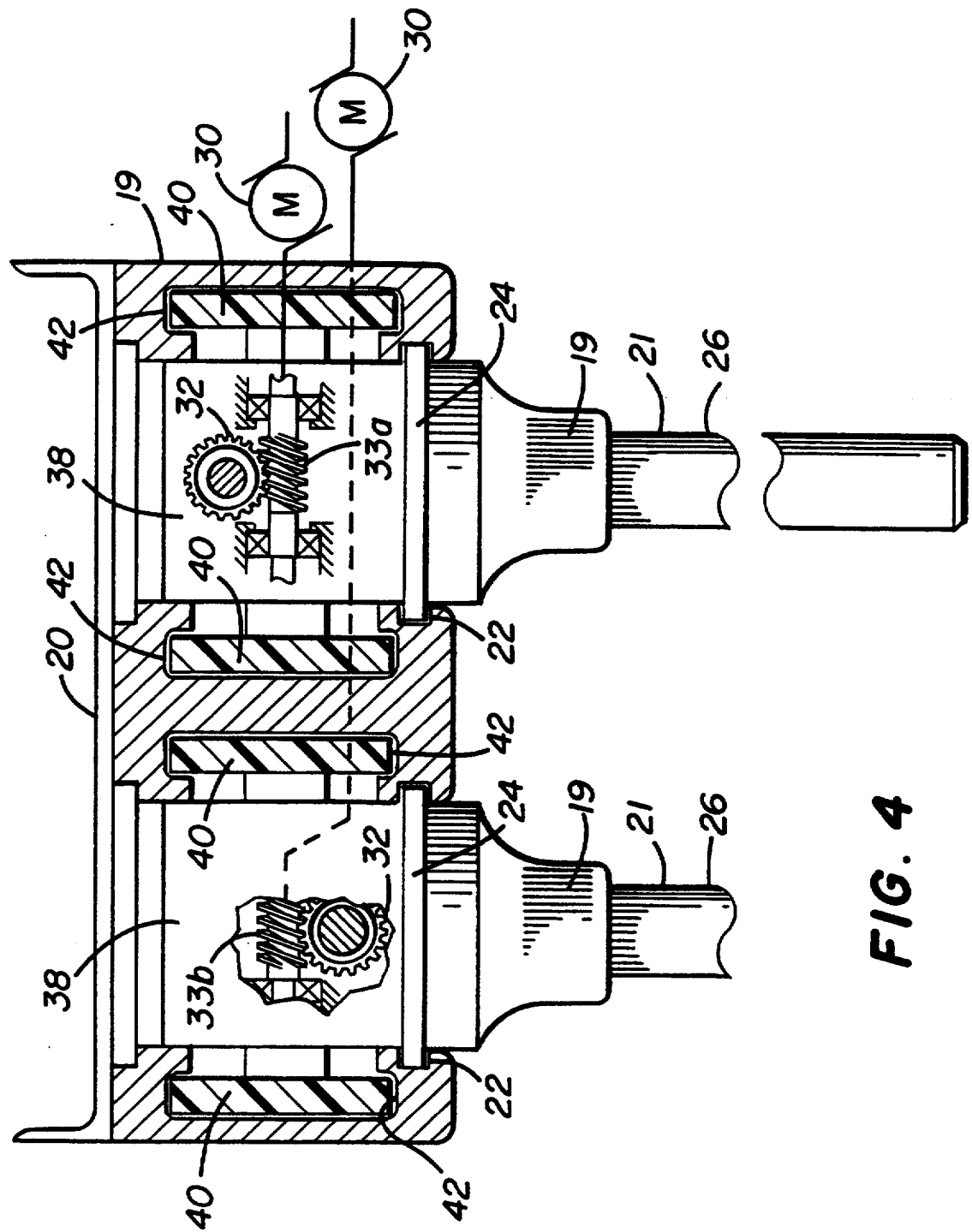
FIG. 4 is a top plan sectional view of a control mast according to the invention.

The non-rotating ball nuts (not shown) of each assembly 34 are mounted in individual sliding blocks 38 adapted to engage each of the lift plates 24. As illustrated in FIG. 4, the sliding blocks 38 engage the lift plates 24 on the side opposite the horizontal support members 26. In further embodiments of the invention (not shown), the sliding blocks 38 and lift plates 24 may also be of integral construction. Each sliding block 38 is also provided with a pair of guides 40 adapted to slidably engage the control mast guide slots 42 of each control mast 20 and thereby facilitate the vertical motion of the siding blocks 38 (see FIG. 4). The guides 40 may comprise various shapes, preferably circular, and may be constructed out of conventional polymeric materials exhibiting a low coefficient of friction, such as nylatron TM.

As illustrated in FIG. 3, the screws 36, which are vertically aligned with each control mast 20, are adapted to operatively engage the individual gear assemblies 32 at one end and the non-rotating ball nuts disposed in the sliding blocks 38. The screws 36 are also restrained at the upper and lower ends by conventional thrust bearings mounted in retainers 42. The retainers 42 are operatively mounted in the screw support members 21 which are operatively mounted in each control mast 20 proximate each end thereof.

In the preferred embodiment, all of the above components 21, 32, 33, 34, 35, 36, 38, 40, 42 with the exception of the electric motors 30, are completely surrounded by the control mast housing 19 and a stainless steel curtain 44 that traverses (with the sliding blocks 38) in nylon grooves (not shown) provided in each control mast track 22 and over the curtain guides (not shown) provided in the screw support members 21 (see FIG. 2). The system is therefore virtually self-contained, requiring minimal space for operation and providing for a more sterile environment. The system also prevents contaminants from affecting the control mast 20 components 32, 33, 34, 35, 36, 38, 40, 42.

In operation, the litter platforms 12 are initially lowered and positioned at an optimum height for loading of the litters 14. The first litter 14, with a patient 11 thereon, is then placed on the top litter platform 72. The litter platform latch (not shown) engages and secures the litter 14 thereon. The litter harness or restraint is then employed to secure the patient 11 to the litter platform 72. The top litter platform 72 is then raised to allow for placement of a second litter 14 on the lower litter platform 70. The second litter 14, with a second patient 11 thereon, is then secured to the lower litter platform 70 in the same manner described above.

Control means 300, comprising computer logic means, are then activated to position the platforms 70, 72 in tiered relation. In further embodiments, the control means 300 may merely comprise a plurality of manually operated switches in circuitry with each of the motors 30 and disposed in one or more strategic locations in the vehicle interior. As illustrated in FIG. 1, the control means 300 may also be employed to tilt either or both tiered litter platforms 70, 72, thus providing trendelenburg (for intubation, subclavian insertion, patients in shock, and/or cord/placenta previa) and reverse trendelenburg (for pulmonary and head injury) capability for at least two patients in each litter rack system 10. The control means further includes a plurality of conventional limit switches operatively connected to the control masts 20 and motors 30 to control and limit the vertical movement of the litter platforms 70, 72 and strategically placed emergency release buttons which return the litter platforms 70, 72 to pre-set "zero" positions in the event of an emergency. The control means may further include crash attenuation means, such as a shock/energy absorption system, which would effectively prevent differential motion of the litters 14 during an abrupt landing or crash.

In the event of a motor 30 malfunction or a vehicle power outage, a manual back-up system (not shown) is also provided to override the motors 30 to vertically adjust (i. e., raise, lower or tilt) each of the litter platforms 70, 72.

As further illustrated in FIG. 1, raising both litter platforms 70, 72 also provides the paramedics or attendants with a raised place to work and also allows for a third litter 16 (i.e., patient) to be placed under the litter platforms 12. The litter 16 may be secured directly to the vehicle floor 7 or, as illustrated in FIG. 1, a mounting pad 13 may be employed to support and secure the litter 16 to the vehicle floor 7. The litter platforms 70, 72 may also be raised completely (not shown) to allow for cargo placement and transport.

Figure 5:
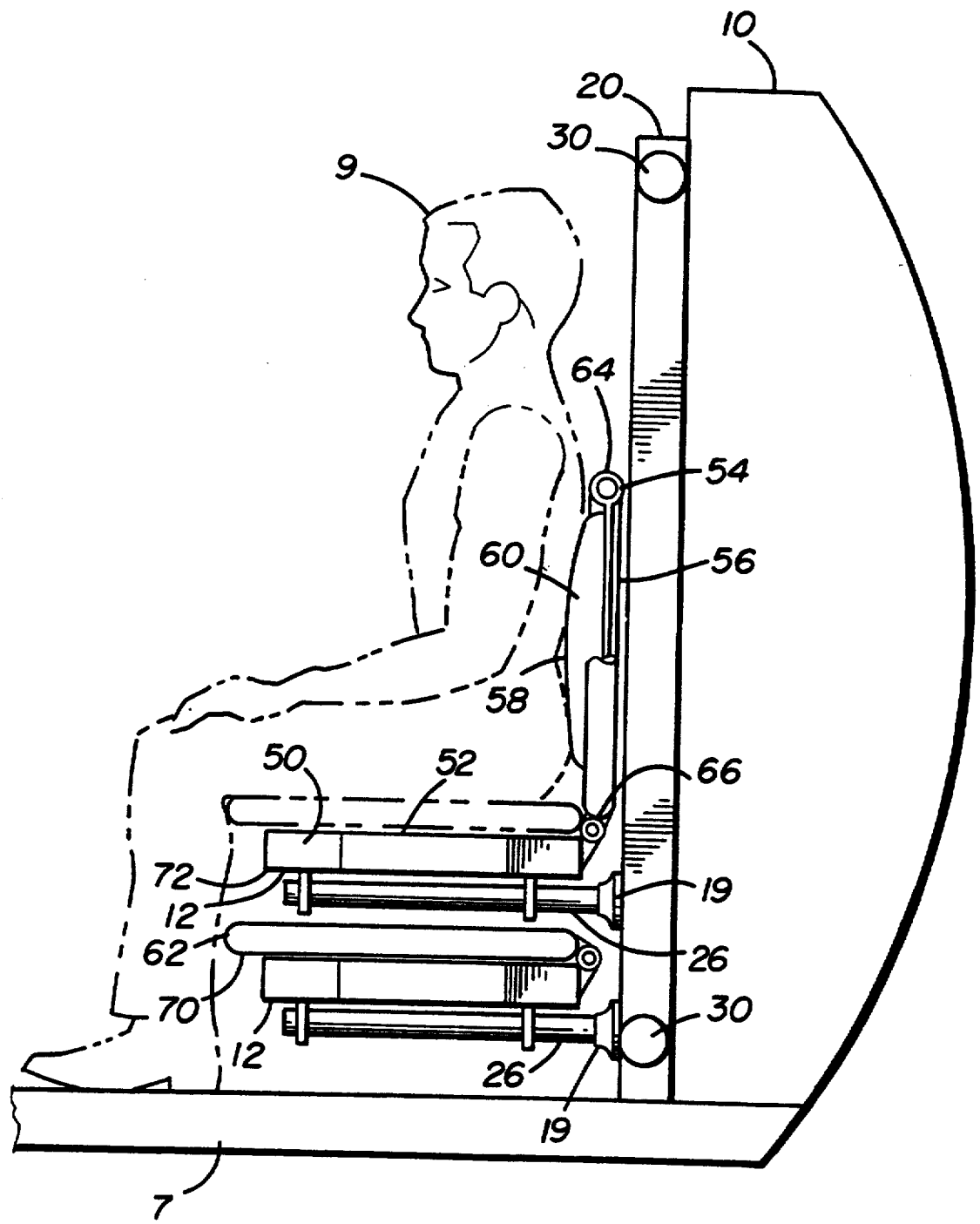
FIG. 5 is a side view of the litter platform support and positioning system illustrating the conversion of the litter platform system shown in FIG. 1 to facilitate seated passenger transport according to the invention.

A further feature of the litter rack system 10 is that at least one of the litter platforms 70, 72 accommodate seated passenger transport, preferably, the top litter platform 72. As illustrated in FIG. 5, the top litter platform is a two-piece mechanism having a substantially rectangular base portion 50 with a top surface 52 defining a conventionally cushioned horizontal seat portion, and a vertically reciprocatable top portion 54 with a top 56 and bottom 58 surface. The bottom surface 58 has an exposed conventionally cushioned seat back forming portion 60 when the top portion 54 is raised from a horizontal position 62 to a vertical position 64. The two piece litter platform 72 is also provided with a conventional hinge 66 which connects the base 50 and top 54 portions, permitting the top portion 54 to be rotated to and from the vertical position 64. The litter platform 72 is also provided with conventional means for retaining the vertically reciprocatable top portion 54 in the vertical 64 and horizontal positions 62 (not shown). The vertically reciprocatable top portion 54 and the base portion 50 include an interconnected conventional harness or restraint system (not shown) for securing seated passengers 9 therein.

To provide for additional seated passenger 9 safety and comfort, the upper litter platform 72 may be provided with at least three reciprocatable head support members (not shown) movable between raised and lowered positions. Thus, by appropriately positioning the litter platforms 70, 72, a seated passenger 9 may be positioned in the lower platform 70 with head support provided by the upper platform 72. Additional details of this feature are set forth in the following further embodiment of the invention.

Figure 6:
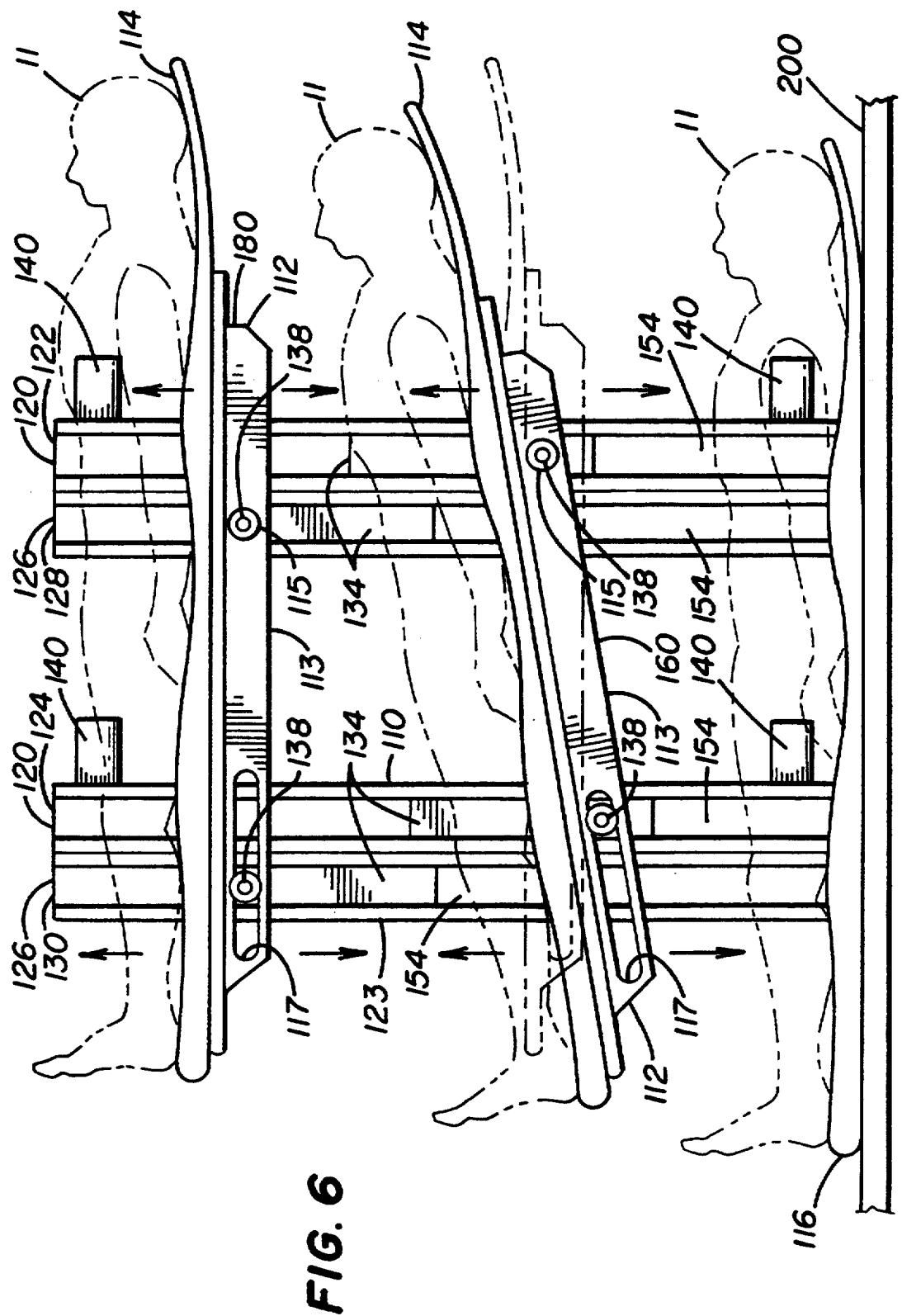
FIG. 6 is a front view of a further embodiment of the litter platform support and positioning system.
Figure 7:
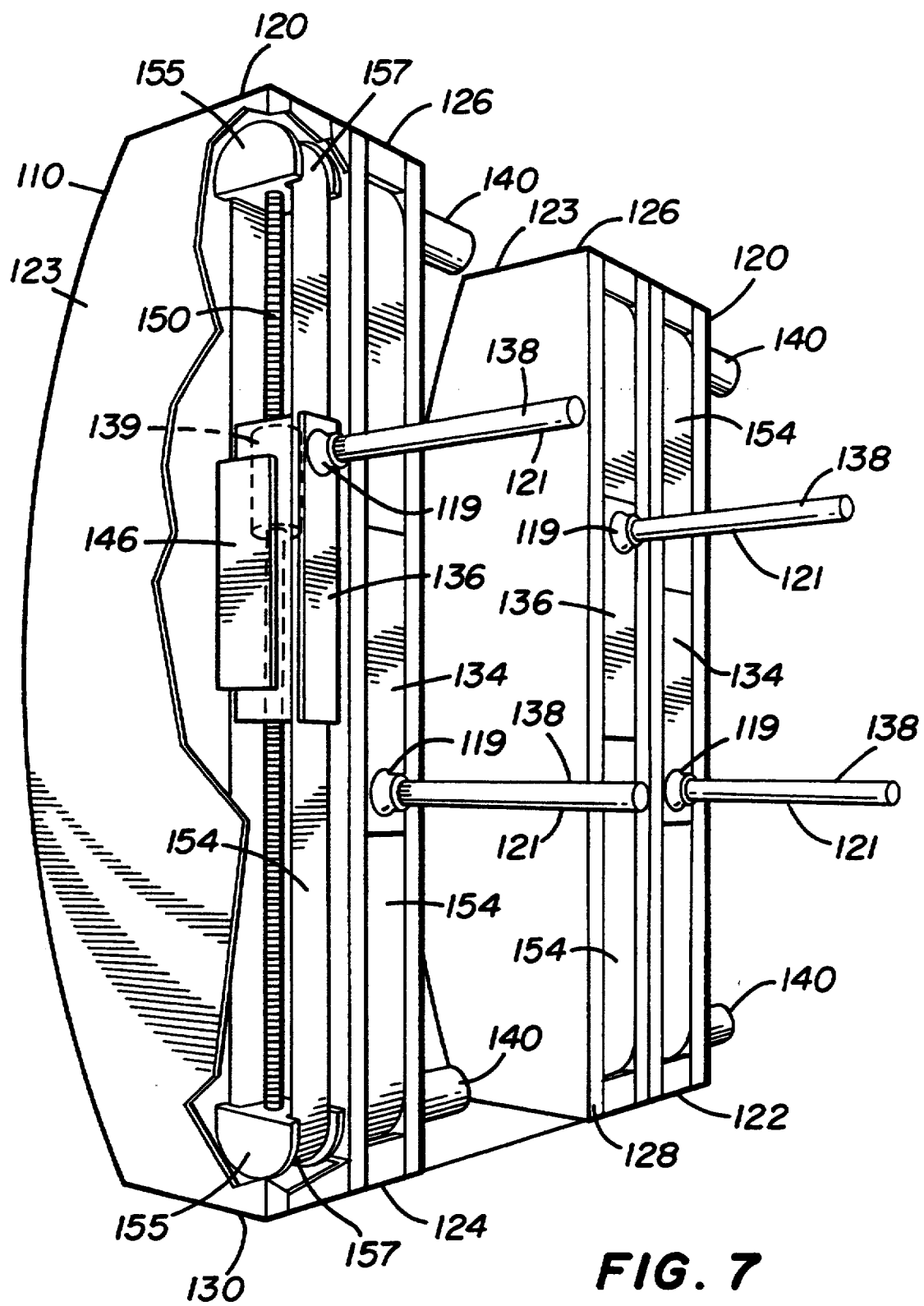
FIG. 7 is a perspective view of a further embodiment of the litter platform support and positioning system.

In a further embodiment of the invention, as illustrated in FIG. 6, the vertical adjustment means of the multi-tiered litter rack system 110 comprises two pair of substantially parallel horizontally spaced vertically elevating control masts 120, 126. The first control mast 120 comprises a first fore 122 and a first aft 124 lift beam which are operatively mounted to the interior wall of the vehicle by conventional means. The second control mast 126 similarly comprises a second fore 128 and second aft 130 lift beam which are operatively mounted to the interior wall of the vehicle by conventional means. The second fore 128 and second aft 130 lift beams are positioned on the interior wall of the vehicle such that the second fore 128 and second aft 130 lift beams are in substantially parallel relation with the first fore 122 and first aft 124 lift beams. Each lift beam 122, 124, 128, 130 is also provided with a track 132 which is disposed within and in parallel relation with each of the lift beams 122, 124, 128, 130 (see FIG. 8).

The support means of the multi-tiered litter rack system 110 comprises two pairs of fore and aft lift plates 134, 136 which are adapted to slidably engage the lift beam tracks 132. The first pair of fore and aft lift plates 134 are adapted to engage the first fore 122 and first aft 124 lift beam tracks 132 and the second pair of fore and aft lift plates 136 are similarly adapted to slidably engage the second fore 128 and second aft 130 lift beam tracks 132. Each of the lift plates 134, 136 are also provided with a horizontal support member 138 which is operatively connected to the lift plates 134, 136 and adapted to rotatably engage one of the litter platforms 112 proximate each end thereof. The support members 138 are similarly adapted to pivotally engage the litter platforms 112 proximate one end and slidably engage the platforms 112 on the opposite end thereof.

Figure 8:
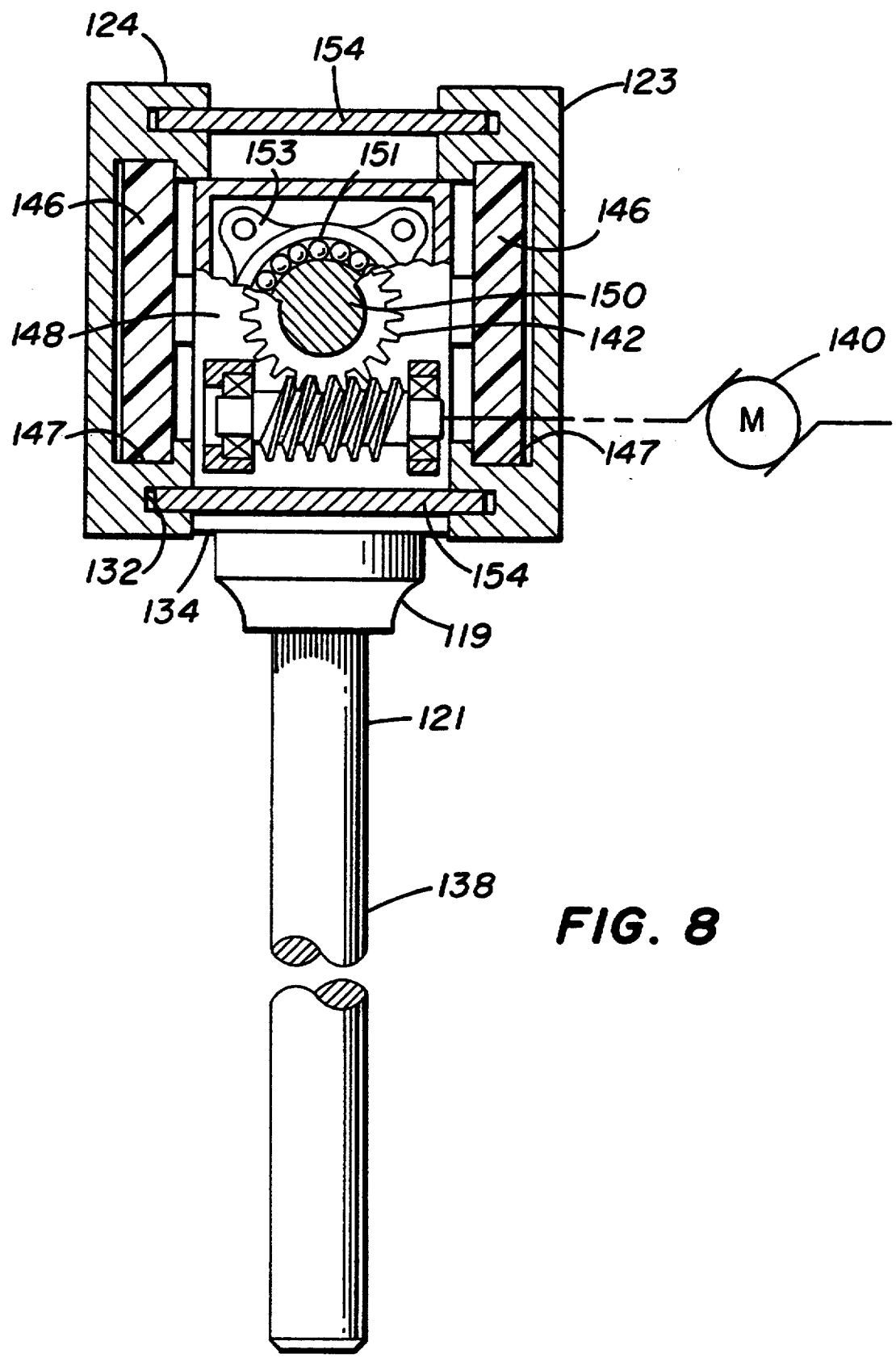
FIG. 8 is a top plan sectional view of a lift beam of a litter platform and support system.

The horizontal support members 138 of this embodiment may similarly comprise a flustrum shaped circular base 119 and an elongated circular rod 121. As illustrated in FIG. 8, the base 119 is operatively attached to lift plates 134, 136 on the large diameter end and designed and configured to engage the circular rod 121 on the small diameter end thereof such that the axes of the base 119 and rod 121 are substantially coincident. As will be recognized by one skilled in the art, the base 119 and rod 121 of this embodiment may also be of integral construction and other support member 138 configurations may be employed.

To receivably engage the horizontal support members 138, the litter platforms 112 similarly include fore and aft support holes 115, 117 which are designed and configured to rotatably receive the horizontal support members 138 (see FIG. 6). To facilitate the tilting of the litter platforms 112 and, thereby, the litters 114, the aft hole 117 of the litter platform 112 also comprises an elongated hole.

To adjust the vertical spacing between and tilting of the litter platforms 112, the vertical adjustment means is further provided with drive means for vertical raising and lowering of the plates 134, 136 in each of the lift beam tracks 132. The drive means may similarly comprise various power options including electrically operated means, pneumatically operated means or even manually operated means, preferably electrically operated means. According to this embodiment, as illustrated in FIG. 6, the electrically operated means comprises four electric motors 140 for synchronously driving the lift plates 134, 136 and thereby lifting and positioning the litter platforms 112. One of each motor 140 is operatively mounted to each lift beam 122, 124, 128, 130.

Figure 9:
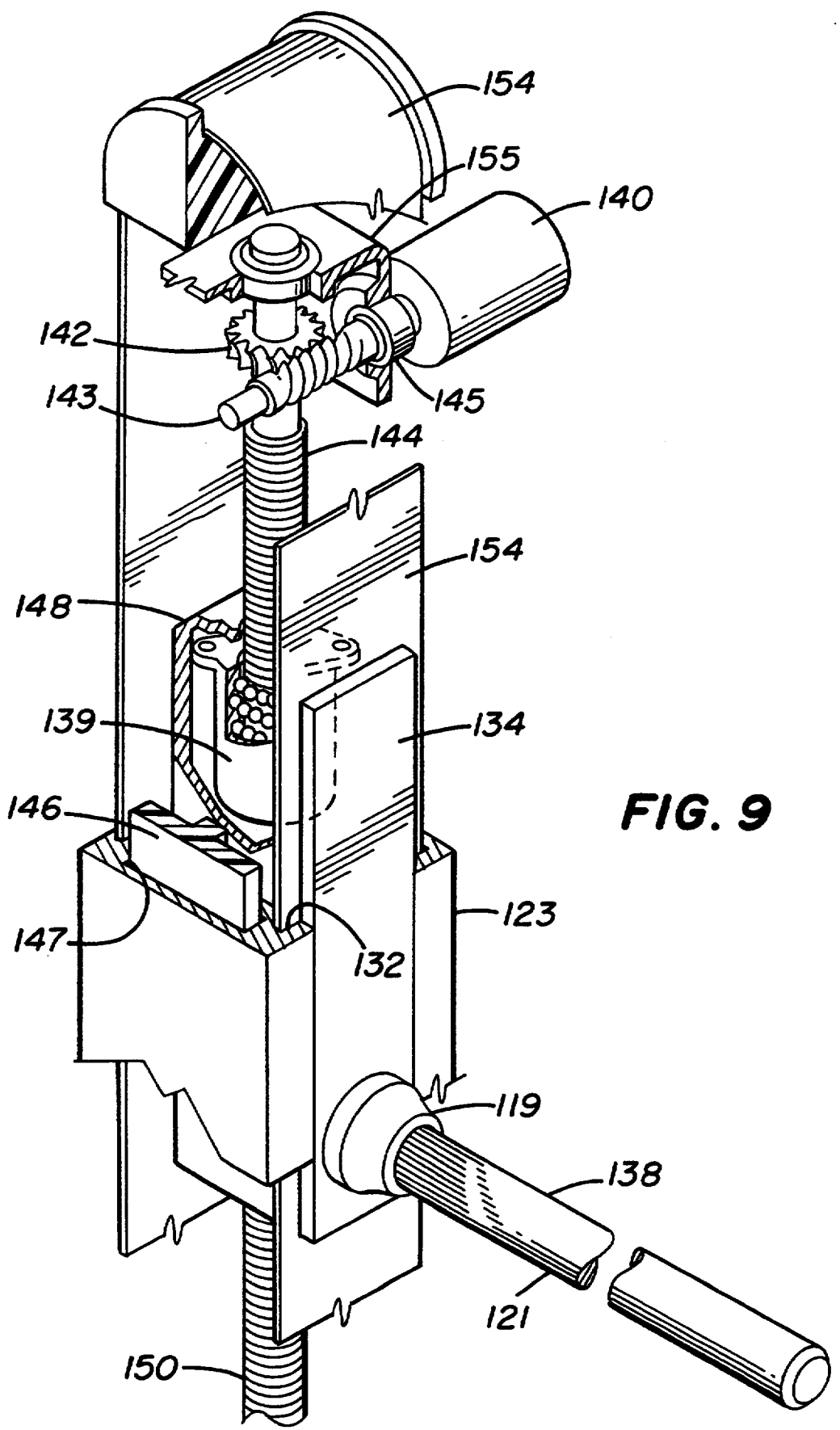
FIG. 9 is a perspective view of the lift beam shown in FIG. 8 illustrating a further embodiment of the vertical adjustment, support and drive means.

As illustrated in FIG. 9, each lift beam 122, 124, 128, 130 is provided with a conventional worm/gear assembly 142 operatively mounted to each beam 122, 124, 128, 130 at the top or bottom thereof proximate each motor 140. The worm gear shafts 143 are similarly designed and configured to operatively engage the motors 140 and are provided with conventional bearing assemblies 115 operatively mounted in each lift beam 122, 124, 128, 130 to support and position each worm gear shaft 143 therein.

Each beam 122, 124, 128, 130 is also provided with a conventional ball nut/screw assembly 144 to transfer power from the gear assembly 142 to the lift plates 134, 136. The non-rotating ball nuts 139 of the assembly are mounted in individual sliding blocks 148 adapted to engage each of the lift plates 134, 136 opposite the horizontal support members 138. In further embodiments of the invention (not shown), the sliding blocks 148 and lift plates 134, 136 may also be of integral construction. Each sliding block 148 is also provided with a pair of guides 146 adapted to slidably engage the guide slots 147 provided in each lift beam 122, 124, 128, 130 and thereby facilitate the vertical motion of the siding blocks 148.

The screws 150 of the ball nut/screw assemblies 144, which are vertically aligned with each lift beam 122, 124, 128, 130, are adapted to engage the individual gear assemblies 142 at one end and the non-rotating ball nuts 139 disposed in the sliding blocks 148. The screws 150 are restrained at the upper and lower ends by conventional thrust bearings 151 mounted in retainers 153. The retainers 153 are operatively mounted in the screw support members 155 which are operatively mounted in each lift beam 122, 124, 128, 130 proximate each end thereof.

In this embodiment, all of the above components 142, 144, 146, 148, 150, with the exception of the electric motors 140, are similarly surrounded by the control mast housing 123 and a stainless steel curtain 154 that traverses (with the sliding blocks 148) in nylon grooves (not shown) provided in each control mast 120, 126 track 132 and over the curtain guides 152 provided in the screw support members 155. The system is therefore virtually self-contained, requiring minimal space for operation and providing for a more sterile environment. The system also prevents contaminants from affecting the control mast 120, 126 components 142, 144, 146, 148, 150.

In operation, the litter platforms 112 are initially lowered and positioned at an optimum height for loading of the litters 114. The first litter 114 with a patient 11 thereon, is then placed on the top litter platform 180. The litter platform latch (not shown) engages and secures the litter 14 thereon. The litter harness or restraint is then employed to secure the patient 11 to the litter platform 180. The top litter platform 180 is then raised to allow for placement of a second litter 114 on the lower litter platform 160. The second litter 114, with a second patient 11 thereon, is then secured to the lower litter platform 160 in the same manner described above.

Control means, similarly comprising computer logic means and/or a plurality of manually operated switches in circuitry with each of the motors 140 and disposed in one or more strategic locations in the helicopter interior, are then be activated to position the platforms 160, 180 in tiered relation. As illustrated in FIG. 6, the control means may also be employed to tilt either or both tiered litter platforms 160, 180, thus providing trendelenburg (for intubation, subclavian insertion, patients in shock, and/or cord/placenta previa) and reverse trendelenburg (for pulmonary and head injury) capability for at least two patients in each litter rack system 110. The control means also includes a plurality of conventional limit switches operatively connected to the control masts 120, 126 and motors 140 to control and limit the vertical movement of the litter platforms 160, 180. The control means may further include crash attenuation means, such as a shock/energy absorption system, which would effectively prevent differential motion of the litters 114 during an abrupt landing or crash.

In the event of a motor 140 malfunction or a vehicle power outage, a manual back-up system (not shown) is similarly provided to override the motors 140 to vertically adjust (i.e., raise, lower or tilt) each of the litter platforms 160, 180.

As further illustrated in FIG. 6, raising both litter platforms 160, 180 also provides the paramedics or attendants with a raised place to work and similarly allows for a third litter 116 (i.e., patient) to be placed on the floor 200 of the vehicle under the litter platforms 160, 180. The litter platforms 160, 180 may also be raised completely (not shown) to allow for cargo placement and transport.

Figure 10:
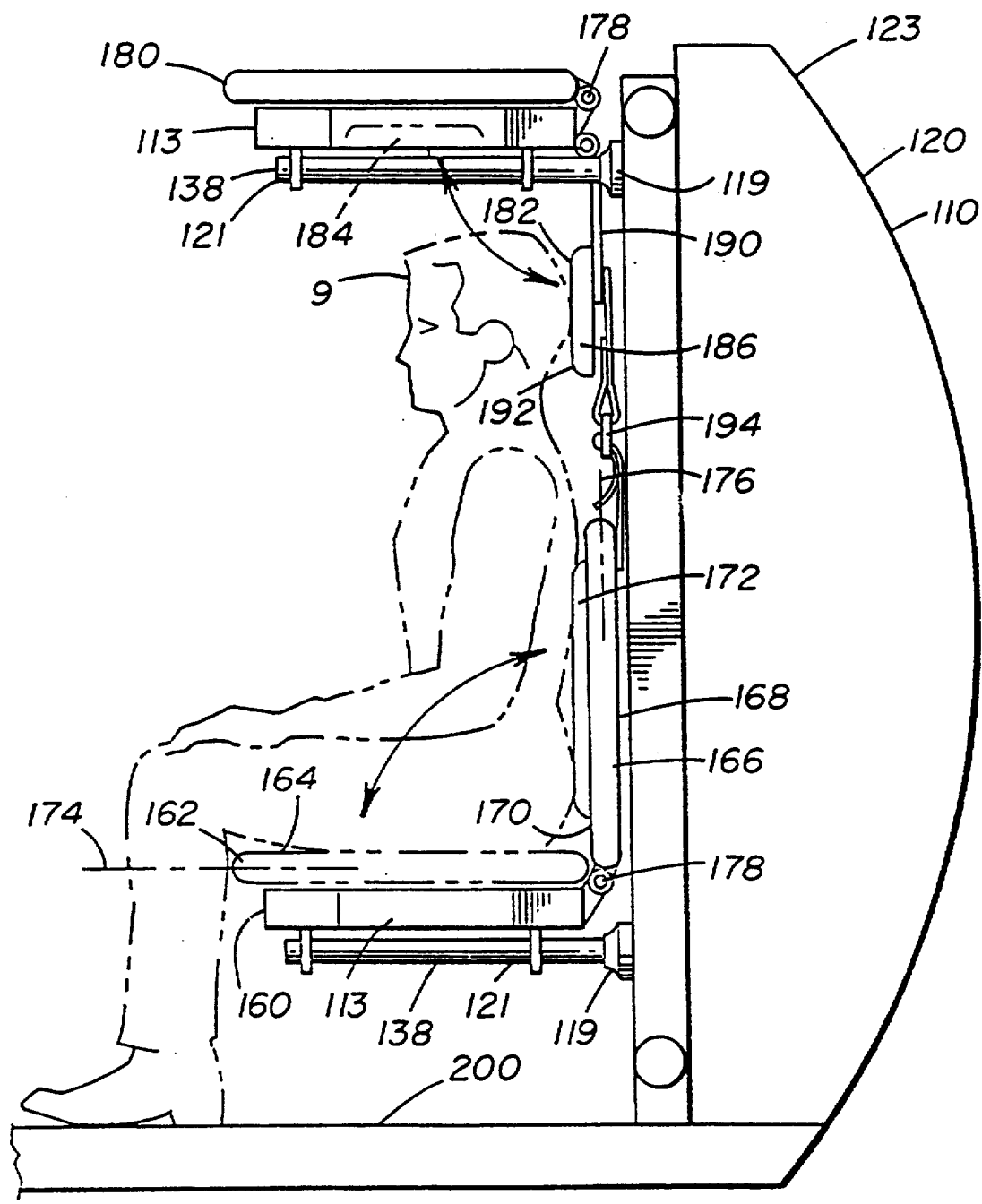
FIG. 10 is a side view of a further embodiment of the litter platform support and positioning system illustrating the conversion of the litter platform shown in FIG. 6 to facilitate seated passenger transport.

As illustrated in FIG. 10 the litter platforms 160, 180 of this embodiment similarly accommodate seated passenger transport. The bottom litter platform 160 is generally a two-piece mechanism having a substantially rectangular base portion 162 with a top surface 164 defining a conventionally cushioned horizontal seat portion, and a vertically reciprocatable top portion 166 with a top 168 and bottom 170 surface. The bottom surface 170 has an exposed conventionally cushioned seat back forming portion 172 when the top portion 166 is raised from a horizontal position 174 to a vertical position 176. The two piece bottom litter platform 160 is also provided with a conventional hinge 178 which connects the base 162 and top 166 portions, permitting the top portion 166 to be rotated to and from the vertical position 176. The litter platform 160 is also provided with conventional means for retaining the vertically reciprocatable top portion 166 in the vertical 176 and horizontal positions 174 (not shown). The vertically reciprocatable top portion 166 and the base portion 162 include an interconnected conventional harness or restraint system (not shown) for securing seated passengers 9 therein.

To provide for additional seated passenger 9 safety and comfort, the upper litter platform 180 is provided with at least three reciprocatable head support members 182 which are movable between raised 184 and lowered positions 186. The head support members 182 generally comprise a support member frame 190 and a conventionally cushioned head rest portion 192 disposed on one end thereof.

The head support members 182 are positioned on the upper litter platform 180 on the bottom portion thereof. A plurality of hinges 188, adapted to rotatably engage each of the head support members 182 at the end opposite the headrest portion 192, are operatively mounted to the upper litter platform frame 113 proximate the inside end. The upper litter platform frame 113 is provided with a conventional latch (not shown) to engage and secure the head support members 182 in the raised position 184. The head support members 182 are also provided with a flexible strap 194 operatively mounted to the support member frame 190 and adapted to engage the bottom litter platform 160 top portion 166 when the top portion 166 is raised to the vertical position 176, thereby securing the head support member(s) 182 in the lowered position 186. Thus, when the bottom litter platform 160 top portion 166 is in the raised or vertical position 176, the head support members 182 are in the secured lowered position 186 and the upper and lower litter platforms 160, 180 are appropriately positioned by the electric motors 140, resilient head support is effectively provided to at least three seated passengers 9 positioned in each litter rack system 10.

Without departing from the spirit and scope of this invention, one of ordinary skill can make various changes and modifications to the invention to adapt it to various usages and conditions. As such, these changes and modifications are properly, equitably, and intended to be, within the full range of equivalents of the following claims.

What is claimed is:

1. A litter platform support system for an emergency medical litter rack system, comprising:

a pair of substantially parallel horizontally spaced substantially vertical control masts, said control masts being mounted to the interior wall of an emergency vehicle;

each of said control masts having a pair of substantially parallel adjacent slots disposed substantially vertically therein, and further having a pair of elongated drive screws, recessed therein, each associated with a respective pair of parallel slots substantially parallel thereto;

a plurality of litter support assemblies, each slideably engaged in a respective one of said control mast slots and each being operatively connected to a respective one of said drive screws for translational movement along the axis thereof upon rotation of said drive screw associated therewith;

said litter support assemblies being adapted to pivotally engage an elongated litter platform proximate one end thereof and slideably engage the platform on the opposite end thereof to permit the platform to tilt toward either end; and a separate electric drive motor operatively coupled to each of said drive screws for separately and controllably rotating same to individually position each of said litter support assemblies along the length of a respective slot to independently adjust and control the elevation and tilt of each of said litter platforms.

2. A system according to claim 1 wherein each of said litter support assemblies includes a pair of lift plates, each of said lift plates adapted to slideably engage a respective one of said control mast slots, said plates further adapted to rotatably receive said elongated drive screws to provide translational movement along the axis of said masts upon rotation of said drive screw associated therewith.

3. A system according to claim 1 including first and second litter platforms, wherein said litter support assemblies are arranged for engaging and supporting said first and second litter platforms with said second litter platform being operatively positioned below said first platform in tiered relation thereto.

4. A system according to claim 3 wherein said second litter platform includes reciprocable seat forming means thereon for configuring said second litter platform as a bench-like passenger seat.

5. A system according to claim 3 wherein said first litter platform includes at least three reciprocable head support members movable between raised and lowered positions, said head support members being operatively mounted to said first litter platform on the bottom portion thereof whereby when said second platform is configured as a bench-like passenger seat, said head supports are in said lowered position and said first and said second litter platforms are appropriately positioned by said electric drive motors, adequate head support is provided to at least three seated passengers.

6. A system according to claim 1 including a control panel operatively connected to each of said drive motors to control said motors from a given location.

* * * * *